United States Patent
Lacroix et al.

(10) Patent No.: US 9,482,261 B2
(45) Date of Patent: Nov. 1, 2016

(54) FASTENING ELEMENT

(71) Applicant: GM GLOBAL TECHNOLOGY OPERATIONS LLC, Detroit, MI (US)

(72) Inventors: Joachim Lacroix, Flonheim (DE); Joerg Schneider, Ruesselsheim (DE)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 83 days.

(21) Appl. No.: 14/036,337

(22) Filed: Sep. 25, 2013

(65) Prior Publication Data

US 2014/0086701 A1   Mar. 27, 2014

(30) Foreign Application Priority Data

Sep. 26, 2012   (DE) .......................... 10 2012 018 947

(51) Int. Cl.
  *F16B 37/04*   (2006.01)
  *F16B 5/02*   (2006.01)

(52) U.S. Cl.
  CPC ........... *F16B 37/044* (2013.01); *F16B 37/043* (2013.01); *F16B 5/0225* (2013.01)

(58) Field of Classification Search
  CPC .... F16B 41/00; F16B 37/044; F16B 37/043; F16B 5/0225
  USPC ......................................... 411/112, 108, 970
  See application file for complete search history.

(56) References Cited

U.S. PATENT DOCUMENTS

| | | | | |
|---|---|---|---|---|
| 1,928,468 A | * | 9/1933 | Tinnerman | F16B 37/041 24/569 |
| 2,571,786 A | * | 10/1951 | Tinnerman | F16B 37/043 411/112 |
| 2,627,385 A | * | 2/1953 | Tinnerman | F16B 9/023 180/68.5 |
| 2,804,180 A | * | 8/1957 | Richardson | F16B 37/044 29/512 |
| 3,646,982 A | * | 3/1972 | Cushman | 411/82.5 |
| 5,407,310 A | * | 4/1995 | Kassouni | B29C 70/76 29/525.02 |
| 5,511,919 A | * | 4/1996 | Scalise | 411/555 |
| 6,457,924 B1 | * | 10/2002 | Wallace | F16B 37/02 174/58 |
| 8,132,992 B2 | * | 3/2012 | van Walraven | F16B 37/046 411/112 |
| 8,403,612 B2 | * | 3/2013 | Wright et al. | 411/367 |
| 2005/0042057 A1 | * | 2/2005 | Konig | F16B 37/043 411/103 |

(Continued)

FOREIGN PATENT DOCUMENTS

DE   1836822 U   8/1961
DE   2617940 A1   11/1977

(Continued)

OTHER PUBLICATIONS

Partial English-language machine translation of pp. 2-4 of DE 18 36 822 U using Google Translate, pp. 1 of 15 through 15 of 15.*

(Continued)

*Primary Examiner* — Flemming Saether
(74) *Attorney, Agent, or Firm* — Lorenz & Kopf LLP

(57) ABSTRACT

A fastening element is provided for a motor vehicle having a nut and a housing accommodating the nut, by which the fastening element can be fastened to a support part, in particular body panel, body attachment part or similar vehicle part of vehicle attachment part. It is provided that the housing is a plastic part with fixing device molded thereon for the clamping and/or positively joined fixing of the fastening element on the support part. A support part is further provided for a motor vehicle, on which a fastening element is fixed. A wiper motor is provided having such a support part.

15 Claims, 2 Drawing Sheets

(56) References Cited

U.S. PATENT DOCUMENTS

2009/0103997 A1* 4/2009 Csik et al. .................... 411/112
2012/0148892 A1* 6/2012 Hoecker et al. ................ 429/99
2013/0187014 A1* 7/2013 James .......................... 411/427

FOREIGN PATENT DOCUMENTS

| DE | 69503312 T2 | 2/1999 |
| DE | 102008020714 A1 | 10/2009 |
| EP | 0 681 110 A1 * | 11/1995 |

OTHER PUBLICATIONS

English-language machine translation of EP 0 681 110 A1 to Leon published Nov. 8, 1995, European Patent Office or EPO's Patent Translation Powered by EPO and Google, available at http://translationportal.epo.org.*

German Patent Office, German Patent Search Report for Application No. 102012018947.8, dated Jul. 18, 2013.

* cited by examiner

FASTENING ELEMENT

CROSS-REFERENCE TO RELATED APPLICATION

This application claims priority to German Patent Application No. 10 2012 018 947.8, filed Sep. 26, 2012, which is incorporated herein by reference in its entirety.

TECHNICAL FIELD

The technical field relates to a fastening element, in particular for a motor vehicle, such as for example a cage nut, and further relates to a support part, in particular for a motor vehicle, on which such a fastening element is fixed.

BACKGROUND

Fastening elements of the type addressed here, which can in particular be designed as so-called cage nut, usually have a nut and a housing accommodating the nut, with which the fastening element can be fastened to a support part. The housing usually serves for pre-fixing the fastening element on the support part, so that an attachment part can be fastened to the support part with a screw connection, without the support part itself having to be provided with a thread for this purpose. The nut of the fastening element, which through the housing is located pre-fixed on the support part, is utilized for producing the screw connection. Only by screwing a screw for example into the nut does a final fastening of the nut of the fastening element on the support part occur, in that a section of the attachment part together with the support part are connected between the screw head and the nut of the fastening element, thus being clamped against one another by the screwing-in of the screw.

In the case of motor vehicles, such fastening elements are usually fixed to the support part by welding, since body panels of the motor vehicle or other vehicle parts or vehicle attachment parts serve as support parts, which are usually sheet metal parts. Correspondingly, the housing of the fastening element is formed of a weldable material. When selecting the weldable material for the housing however it must be observed that with respect to the material of the support part the forming of an electrochemical voltage series is avoided.

In view of the foregoing, at least one object is to provide a fastening element having the features mentioned at the outset, through which with respect to the selection of the material for the housing the risk of an unfavorable electrochemical voltage series is avoided and which can be produced relatively cost-effectively and which is relatively light in weight. In addition, other objects, desirable features and characteristics will become apparent from the subsequent summary and detailed description, and the appended claims, taken in conjunction with the accompanying drawings and this background.

SUMMARY

A fastening element, in particular for a motor vehicle, in particular a cage nut, has a nut and a housing accommodating the nut, with which the fastening element can be fastened to a support part. The housing can be formed, for example, in the manner of a cage. The support part is for example a body panel or similar vehicle part. The support part can also be a body attachment part or similar vehicle attachment part. The housing is a plastic part with fixing device molded thereon for the clamping and/or positively joined fixing of the fastening element to the support part.

is the embodiments are at least partially based on the idea of realizing a fixing of the fastening element on a support part in a manner other than through welding in order to thus form the housing in a material which cannot be a co-reactant for an electrochemical voltage series. The housing is therefore formed of plastic. Through the fixing device molded thereon, the fastening element is designed for the clamping and/or positively joined fixing, in particular pre-fixing on the support part. In that the housing and the fix device consist of plastic, the fastening element is additionally relatively light in weight and can be produced relatively cost-effectively.

A further reduction of the manufacturing costs for the fastener can be achieved when according to a configuration the housing is realized together with the fixing device through injection molding. In this regard, the housing and the fixing device are formed through an injection molding, in particular a joint injection molding.

The material properties of the housing can be favorably realized in particular when according to a further configuration the housing consists of a thermoplastic. For example, the housing can be formed of polypropylene. This thermoplastic material is particularly suitable for forming the housing with respect to its properties and cost-effective at the same time. Preferably, the housing together with the fixing device is formed of a thermoplastic, in particular polypropylene.

The fastening element is suitable for use in or on a motor vehicle, such as for example passenger cars and commercial vehicles. Conceivable is the use of the fastening element in all fields of mechanical engineering. For example, the fastening element can be employed on two-wheeled vehicles, in particular bicycles, and/or their production.

According to an embodiment it is provided that the housing at least partially surrounds the nut so that the nut is secured from falling out of the housing through the walls of the housing. Because of this, the assembly of an attachment part or other component making use of the fastening element already attached to the support part is particularly facilitated for the worker, since regardless of the installation position of the fastening element on the support part, the worker need not pay any attention that the nut falls out of the housing.

According to a further embodiment it is provided that the housing at least partially surrounds the nut, so that the nut is secured against rotating relative to the housing through the walls. This measure, too, produces an assembly facilitation for the worker since when screwing a screw element into the nut, for example during the course of the assembly of an attachment part to the support part, the worker need not employ an additional tool in order to prevent co-rotating of the nut of the fastening element when screwing in a screw element; for the anti-rotation safeguard is already realized through the housing itself According to a further embodiment it is provided that the housing is formed in the manner of a cuboid or other parallelepiped, whose one side forms a contact side against the support part. Because of this, the housing can be realized in a technically simple manner. Through the contact side, the nut can be particularly favorably brought into an assembly position, in which a screw element subject to the intermediate connection of an attachment part and of the support part can be screwed into the nut without problem.

According to a further embodiment it is provided that the contact side and a flat side of the housing located opposite each comprise a through-opening exposing the threaded bore of the nut. Because of this, screwing-in of a screw element is possible from both the side of the support part, namely from the contact side of the housing, as well as from the opposite side of the housing, namely from the flat side.

The through-opening of the contact side and the through-opening of the flat side are each formed as elongated holes, which are substantially arranged congruently to one another. Because of this, a slight shifting of the nut within the housing can be carried out even with a screw element screwed into the nut, for example during the course of connecting an attachment part to the support part, so that in this way a tolerance compensation becomes possible. Preferably, the contact side and the opposite flat side are connected to one another through an at least partially surrounding wall of the housing. Because of this, a particularly stable housing is achieved.

A further embodiment includes the fixing device is formed through at least one, preferentially at least two engagement, clip-on or similar connecting elements, which stand away from the housing towards the outside. Because of this a positively joined and/or clamping fixing of the fastening element on the support part is realized in a technically simple manner. Through the connecting elements standing away towards the outside, clipping-on or engaging of the fastening element in corresponding abutments of the support part, for example on the rimming of openings of the support part is particularly facilitated.

Two opposite side walls of the housing each comprise at least one of the connecting elements. Because of this, an adequately strong pre-fixing of the fastening element on the support part can be realized, at the same time because of the arrangement of the connecting elements which are symmetrical to one another the housing itself can be realized in a technically simple manner. The connecting elements are arranged in the region of the edges of the side walls. Because of this, the connecting elements molded onto the housing can be realized in a technically simple manner.

A support part is provided for a motor vehicle, in particular a body panel, body attachment part or similar vehicle part or vehicle attachment part, on which a fastening element of the type described above is fixed, in that the fixing device of the fastening element engage in at least one opening of the support part in a clamping and/or positively joining manner. The support part can be a sheet metal part. Because of the configuration of the housing of the fastening element of a plastic material, the risk that the sheet metal part forms an electrochemical voltage series with the housing and that corrosion occurs in the connecting region at an early stage is avoided.

A fastening element is realized that can be designed as a clip-on capable cage nut. Such a clip-on capable cage nut can be clipped into any desired material of a support part. One merely requires suitable holes, against which the clip-on capable cage nut can be clipped on by a worker.

BRIEF DESCRIPTION OF THE DRAWINGS

The present invention will hereinafter be described in conjunction with the following drawing figures, wherein like numerals denote like elements, and.

DETAILED DESCRIPTION

The following detailed description is merely exemplary in nature and is not intended to limit application and uses. Furthermore, there is no intention to be bound by any theory presented in the preceding background or summary or the following detailed description.

Figure 1:
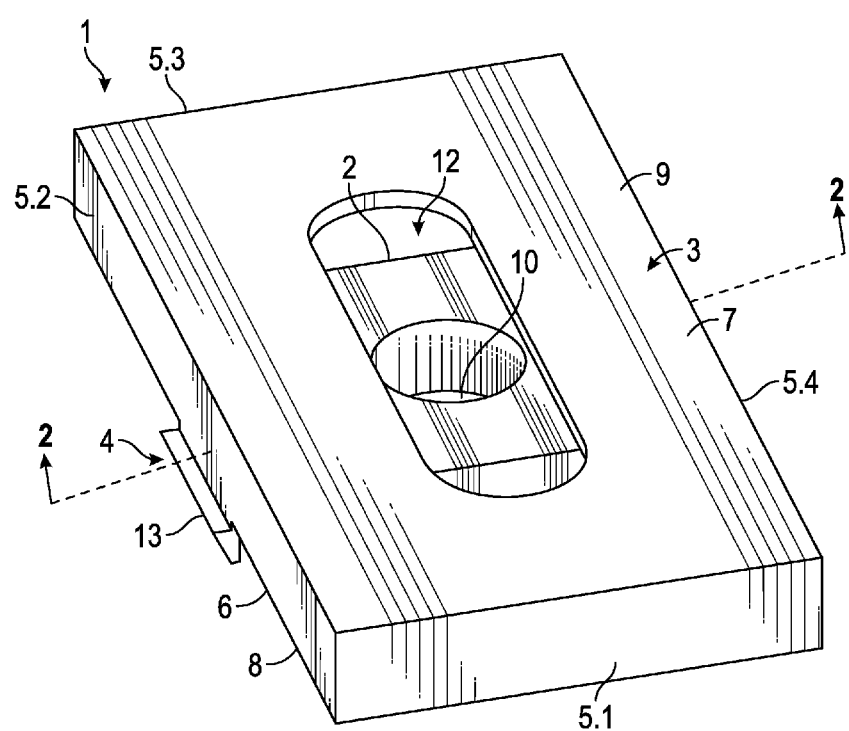
FIG. 1 is an embodiment of a fastening element for a motor vehicle in perspective representation.

FIG. 1 shows, in schematic representation, a possible embodiment of a fastening element 1 for a motor vehicle. The fastening element 1 is a so-called cage nut and comprises a nut 2 and a housing 3 accommodating the nut 2, the so-called cage, by which the fastening element 1 can be fastened to a support part (not shown in FIG. 1).

It is provided that the housing 3 is a plastic part with fixing device 4 molded thereon for the clamping and/or positively joined fixing of the fastening element 1 on a support part (not shown in FIG. 1). The housing 3 surrounds the nut 2 in the manner that the nut 2 is secured against falling out of the housing 3 by walls 5.1, 5.2, 5.3, 5.4, 6 and 7 of the housing 3. Furthermore, the housing 3 surrounds the nut 2 in the manner that the nut 2 is secured against rotating relative to the housing 3 by the walls 5.1, 5.2, 5.3 and 5.4.

Figure 2:
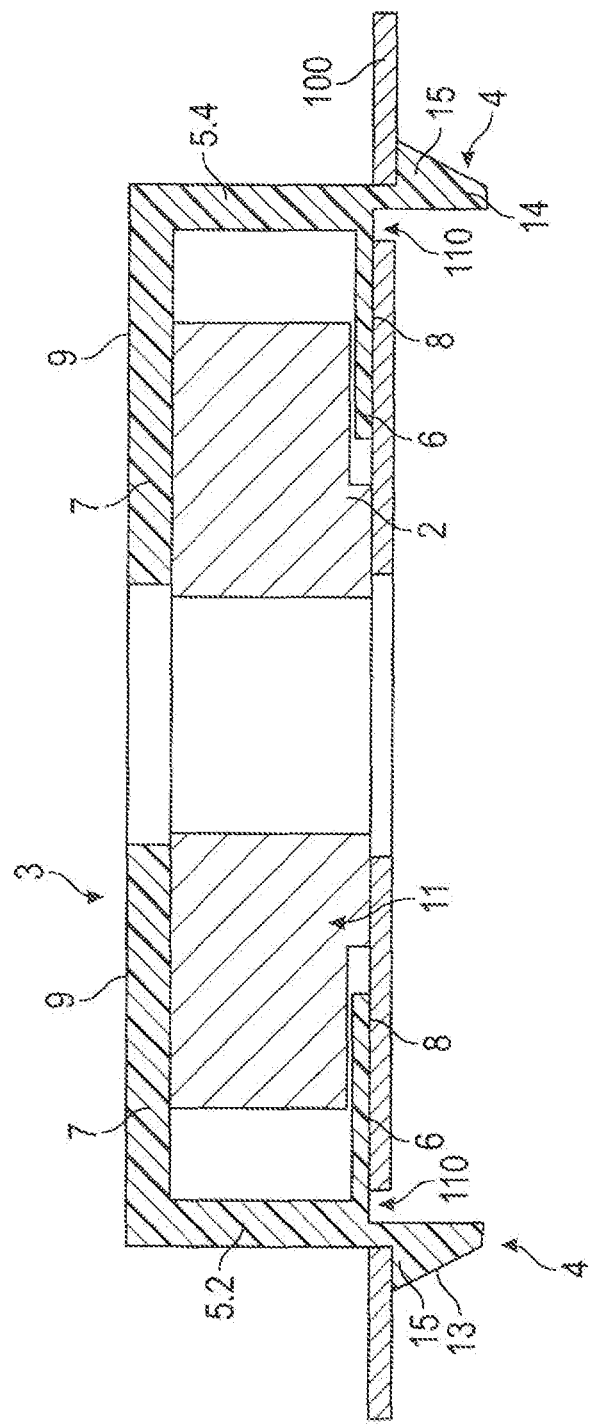
FIG. 2 is the fastening element according to FIG. 1 in the installed state on a support plate in sectional representation.

FIG. 2 shows the fastening element 1 in the installed state on a support part 100. The fastening element 1 and the support part 100 are each shown in sectional representation in the region of two lateral ends of the fastening element 1. As is evident from the FIG. 1 and FIG. 2, the housing 3 is formed in the manner of a cuboid, whose one side forms a contact side 8, wherein the contact side 8 and an opposite flat side 9 of the housing 3 each comprise a through-opening 11 and 12 exposing the threaded bore 10 of the nut 2. Preferably, the contact side 8 is formed through the wall 6 and the flat side 9 is formed through the wall 7 of the housing 3.

As is evident from FIG. 1, the through-opening 12 of the flat side 9 is formed as an elongated hole. Preferably, the through-opening 11 of the contact side 8 evident from FIG. 2 is also formed as an elongated hole, wherein preferably both through-openings 11 and 12 are substantially located congruently to one another. As is evident in particular from FIG. 1, the contact side 8 and the flat side 9 are connected to one another through the walls 5.1, 5.2, 5.3 and 5.4, so that the walls 5.1, 5.2, 5.3 and 5.4 form a surrounding wall.

In the embodiment according to the FIG. 1 and FIG. 2, the fixing device 4 molded onto the housing 3 are formed through two connecting elements 13, 14 in the manner of an engagement/clip-on element, which stand away from the housing 3 towards the outside. As is evident in particular from FIG. 2, one of the connecting elements 14 each is molded onto the opposite walls 5.2 and 5.4, which respectively engage in a corresponding opening 110 of the support part 100 in a positively joined manner. The connecting elements 13 and 14 preferably comprise an engagement lug 15 standing away towards the outside, which following the establishment of the engagement/clip-on connection between the fastening element 1 and the support part 100 are brought into operational position against the respective opening 110 of the support part 100 and thus form the positively joined connection.

The connecting elements 13, 14 can be moved in the direction of one another through compressing, so that the engagement lug 15 of the respective connecting element 13 and 14 is rendered out of engagement with the associated rimming of the respective opening 110 of the support part 100 and the fastening element 1 can thus be disconnected from the support part 100 again. The support part 100 can be any desired vehicle part or vehicle attachment part of a motor vehicle. For example, the support part can be a body panel or a body attachment part.

While at least one exemplary embodiment has been presented in the foregoing summary and detailed description, it should be appreciated that a vast number of variations exist. It should also be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing an exemplary embodiment, it being understood that various changes may be made in the function and arrangement of elements described in an exemplary embodiment without departing from the scope as set forth in the appended claims and their legal equivalents.

What is claimed is:

1. A fastening arrangement for a motor vehicle, comprising:
   a support part defining a first side and a second side and defining a void and a pair of openings separate from the void; and
   a fastening element comprising:
      a nut having a protruding portion that contacts the first side of the support part,
      a housing comprising plastic, disposed on the first side of the support part, accommodating the nut, and defining a pair of through-openings at least one of which is partially congruent with the void, the housing including a first wall having a first contact surface that extends from a first sidewall towards the at least one through-second, and a second wall having a second contact surface that extends from a second sidewall towards the at least one through-opening, the first contact surface and the second contact surface adapted to at least partially contact a surface of the nut to retain the nut within the housing, and the first wall and the second wall contact the first side of the support part, and
      a fixing device connected to the housing and including a pair of connecting elements each clamping against an inner surface of one the openings and to the second side of the support part for fixing the fastening element to the support part,
   wherein the connecting elements are compressible toward one another for disconnecting the fastening element from the support part.

2. The fastening arrangement according to claim 1, wherein the housing is an injection molding housing.

3. The fastening arrangement according to claim 1, wherein the housing comprises a thermoplastic.

4. The fastening arrangement according to claim 3, wherein the thermoplastic is polypropylene.

5. The fastening arrangement according to claim 1, wherein the housing at least partially surrounds the nut so that the nut is secured against falling out of the housing through a wall of the housing.

6. The fastening arrangement according to claim 1, wherein the housing at least partially surrounds the nut so that the nut is secured against rotating relative to the housing through a wall of the housing.

7. The fastening arrangement according to claim 1,
   wherein the housing is a cuboid having one side that forms a contact side against the support part,
   wherein the contact side and an opposite flat side of the housing each comprise a through-opening exposing a threaded bore of the nut.

8. The fastening arrangement according to claim 7, wherein each through-opening is an elongated hole.

9. The fastening arrangement according to claim 7, wherein the contact side and the opposite flat side are connected to one another through a partially surrounding wall.

10. The fastening arrangement according to claim 1, wherein the connecting elements stand away from the housing toward an outside.

11. The fastening arrangement according to claim 10, wherein two opposite side walls of the housing each comprise at least one of the connecting elements.

12. The fastening arrangement according to claim 1, wherein the support part is a body panel.

13. The fastening arrangement according to claim 1, wherein the support part is a body attachment part.

14. The fastening arrangement according to claim 1, wherein the support part is a vehicle attachment part.

15. The fastening arrangement according to claim 1, wherein the support part is a sheet metal part.

* * * * *